Figures 1, 2:
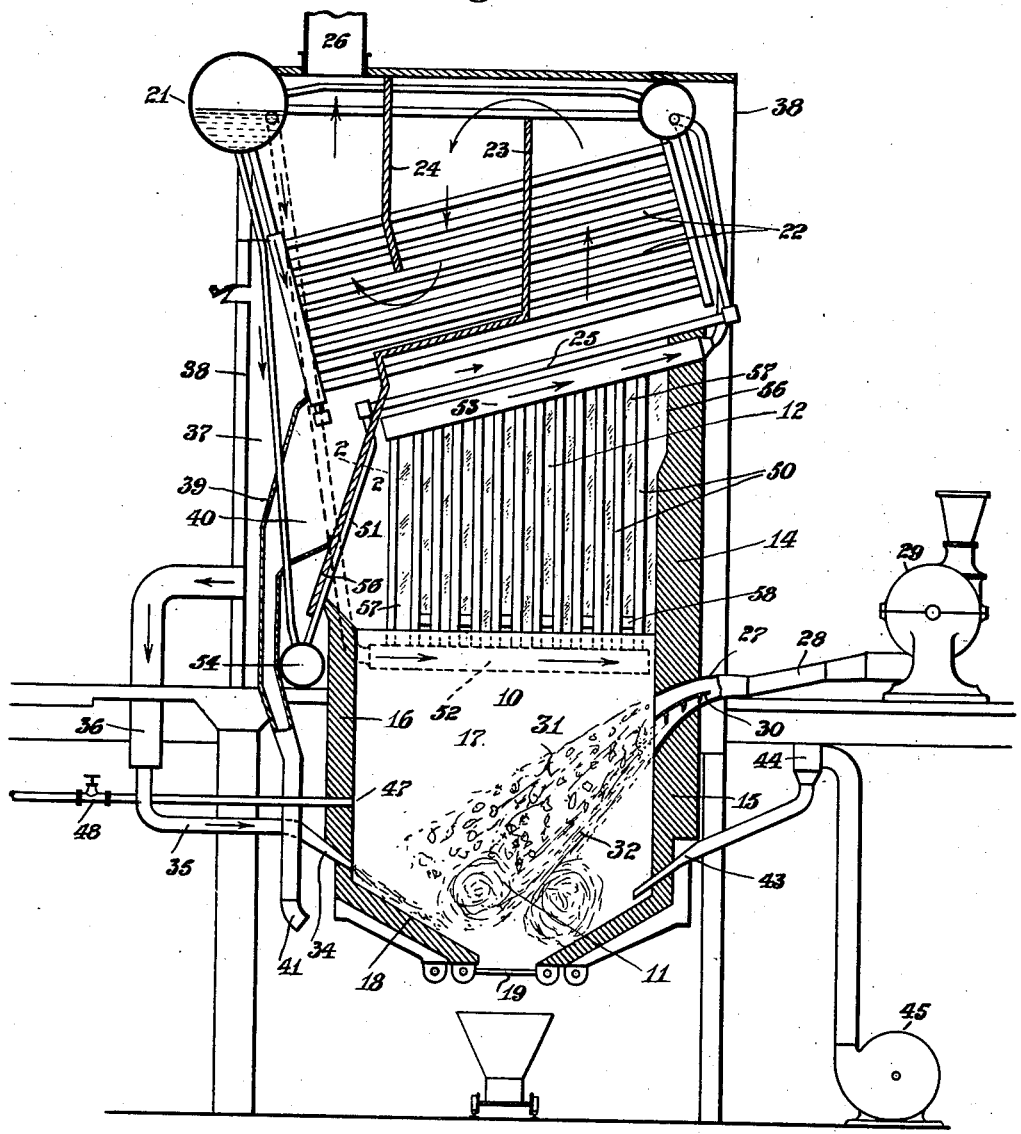

May 17, 1932. J. G. COUTANT 1,858,450
PULVERIZED FUEL COMBUSTION
Filed Oct. 5, 1925 3 Sheets-Sheet 1

INVENTOR
Jay Gould Coutant
BY
Rogers, Kennedy & Campbell
ATTORNEYS.

May 17, 1932.　　　J. G. COUTANT　　　1,858,450
PULVERIZED FUEL COMBUSTION
Filed Oct. 5, 1925　　　3 Sheets-Sheet 2

May 17, 1932. J. G. COUTANT 1,858,450
PULVERIZED FUEL COMBUSTION
Filed Oct. 5, 1925 3 Sheets-Sheet 3
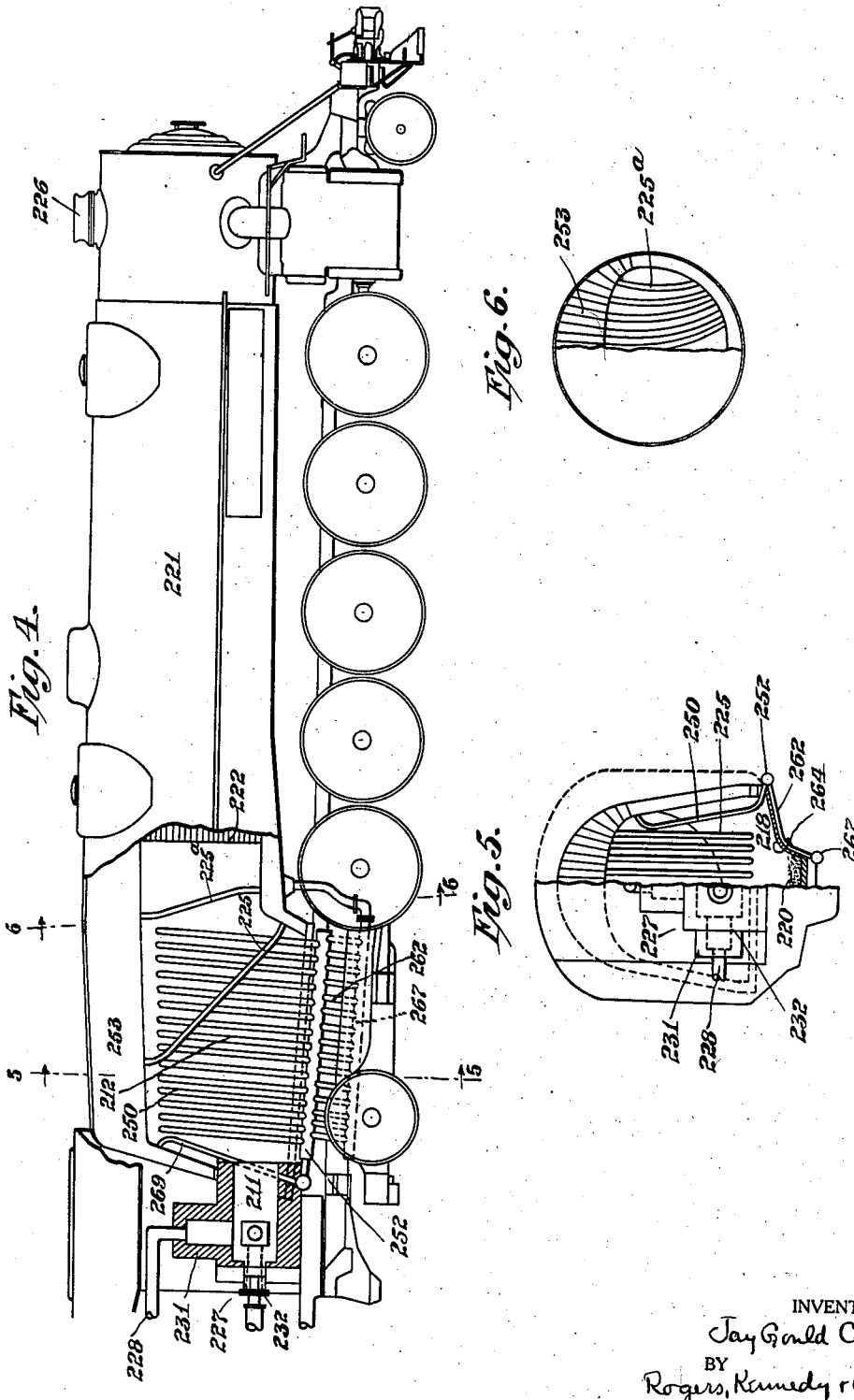
INVENTOR
Jay Gould Coutant
BY
Rogers, Kennedy & Campbell
ATTORNEYS.

Patented May 17, 1932

1,858,450

UNITED STATES PATENT OFFICE

JAY GOULD COUTANT, OF NEW YORK, N. Y., ASSIGNOR, BY MESNE ASSIGNMENTS, TO DRAKE NON-CLINKERING FURNACE BLOCK COMPANY, INC., A CORPORATION OF NEW YORK

PULVERIZED FUEL COMBUSTION

Application filed October 5, 1925, Serial No. 60,435, and in France October 7, 1924.

This invention relates to pulverized fuel combustion, and has reference both to the method herein disclosed and the apparatus or furnace for carrying out the same. The chief field of utility of the present invention is in the firing of various furnaces, such as boiler furnaces, and as herein described the invention is primarily designed for the controlled combustion of pulverized coal, although equivalent fuel could in some cases be substituted.

General objects of the present invention are: to improve efficiency in firing furnaces with pulverized fuel, while increasing convenience of operation and durability of the furnace, and minimizing upkeep cost; and further to afford such control over the combustion as practically to eliminate or minimize defects existing in methods and furnaces heretofore known.

Specific objects are to afford an increased rate of fuel combustion per unit of furnace volume, and a high rate of evaporation per unit of boiler heating surface. These advantages not merely economize in the size, volume, and expense of building and maintaining furnaces, but permit extremely high forced combustion during periods of excessive duty; thus meeting one of the problems in the great central power stations, where variations of load and duty are sometimes extreme. Another object is to obviate certain conditions frequently resulting in losses through incomplete combustion. It has heretofore been proposed to place a water screen somewhat above the furnace bottom or floor, and it has been even proposed to surround the combustion chamber entirely with water cooled surfaces or boiler tubes. I find these result in too great cooling down of the combustion temperature, and therefore substantial loss through failure completely to burn the fuel, unless indeed the size of the combustion chamber is greatly enlarged to permit the fuel to be burned completely at the reduced combustion temperature. By the present invention the amount of expensive refractory brick construction is greatly reduced, and an interior ash chamber below a water screen is rendered unnecessary. The present invention moreover affords the advantages recited without incurring the problems and drawbacks frequently resulting from the melting of the fuel ash in suspension, the fusion point of which may be somewhere between 1922° and 2372° Fahrenheit. Thus, the entrained melted ash has been liable to be carried to the tubes of the boiler and there deposited and solidified, forming a coating obstructing the passage of heat and the travel of gases; and as well has sometimes deposited upon and run down the furnace side walls, solidifying at certain points and building out objectionable projections in the combustion chamber; requiring shutting down of the boiler and furnace for removal. Other objects and advantages of the present invention will be pointed out in the hereinafter following specification or will be apparent to those skilled in the subject.

To the attainment of the objects and advantages recited, the present invention consists in the novel principles and methods of pulverized fuel combustion, and the novel apparatuses, herein illustrated or described, as well as the novel features of method, operation, structure, combination, arrangement and detail.

The invention may, in one aspect, be particularly described as consisting in introducing the pulverized fuel, with suitable provision for air of combustion, near the furnace bottom or floor, which is preferably cooled, thereby establishing the hottest zone in the lower part of the combustion chamber, with a temperature so high that complete combustion is assured, the laterally surrounding walls preferably being not water cooled, but adapted to cooperate in maintaining the high combustion temperature in this first zone; and maintaining above or beyond such first zone a temperature reducing zone, in which the combustion gases are allowed or caused to cool progressively toward the boiler, the wall surrounding the temperature reducing zone being preferably water cooled, to cooperate in the temperature reducing action and to increase the evaporation by direct heating; until the gases, having passed through the temperature reducing zone, arrive at the boiler at a temperature which is effectively high but below the ash fusion point. By the cooling of the bottom or floor or transverse wall of the first zone is meant a continual heat extraction enabling it to absorb and dispose of or utilize large quantities of radiant heat of combustion without itself overheating, and remaining at low enough temperature to prevent melted ash depositing upon it as slag, but causing the ash to solidify into finely divided material, readily cleared off in any suitable manner. The further principles and features of the invention, considered as a method, and the preferred apparatus features, will be elaborated in the specific description following.

In the accompanying drawings Fig. 1 is a vertical section of a water tube boiler with a furnace, embodying the principles of the present invention, and Fig. 2 a detail section taken on either of the lines 2—2 of Fig. 1; these figures corresponding with the figures of the drawings of my French patent application, filed October 7, 1924, Serial Number 193,631.

Figure 3:
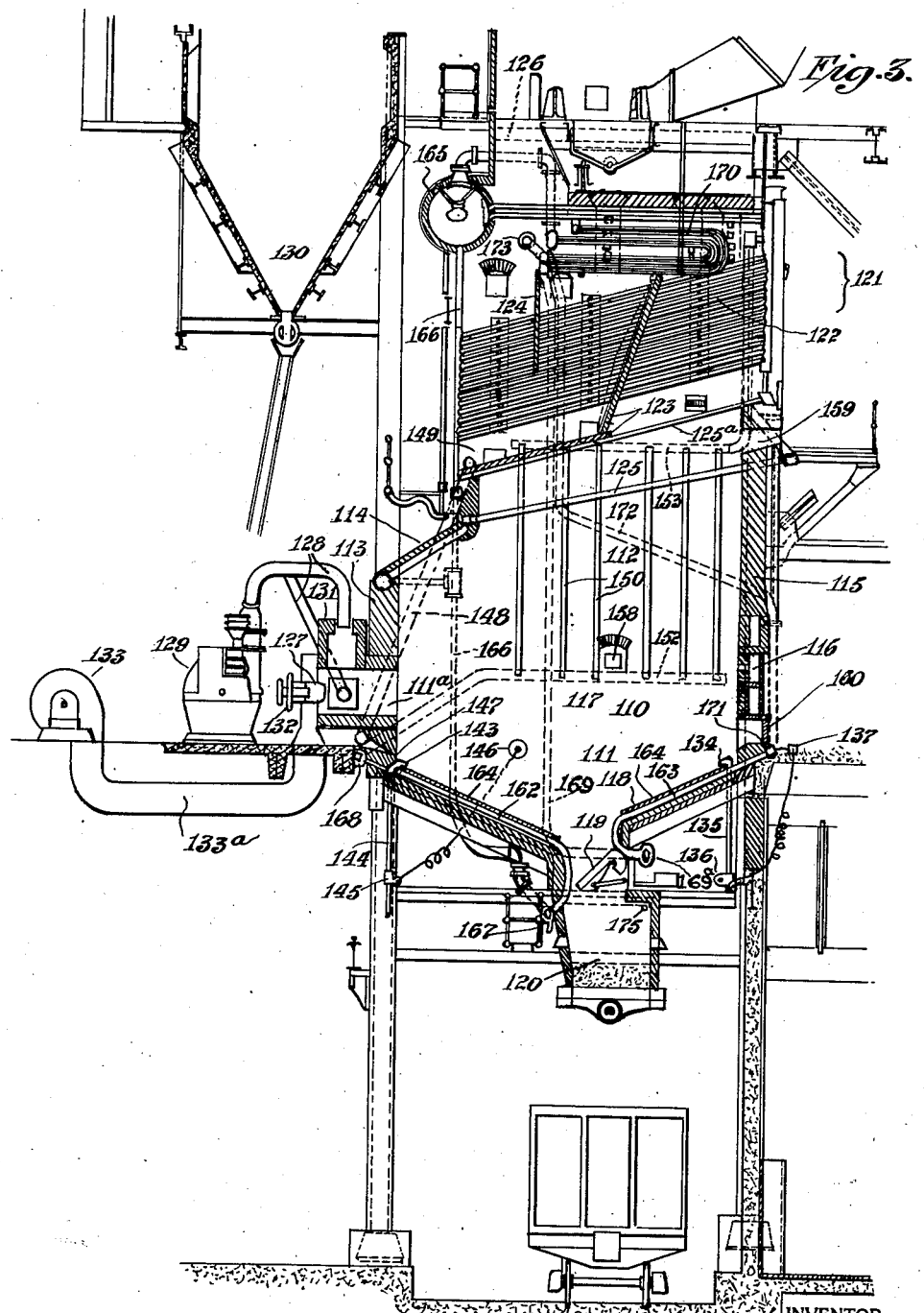

Fig. 3 is a view similar to Fig. 1 showing a different and more elaborate embodiment of the invention, with several additional features not disclosed in Fig. 1.

Fig. 4 is a side elevation partly in longitudinal section of an embodiment of the invention applied to locomotive boilers. Fig. 5 is a vertical section taken on the line 5—5 of Fig. 4. Fig. 6 is a similar section taken on the line 6—6 of Fig. 4.

Referring first to the embodiments of Figs. 1 and 2, the combustion chamber 10 may be considered as consisting of a first or lower or high temperature zone 11, and a second or upper or temperature reducing zone 12. The terms upper, lower and the like are merely relative, as the entire system might in some cases be turned from vertical to horizontal. For convenience the right side of Fig. 1 will be considered the front. The chamber 10 here is bounded by an upper front side wall 14, and a continuation 15 thereof constituting the lower front wall, bounding respectively the front sides of the zones 12 and 11. Opposite to wall 15 is the rear side wall 16, and opposite end walls 17 complete the lateral walls of the high temperature zone. The described walls 15, 16, 17 may consist of high heat resisting refractory material or bricks, such as silicon carbide, or plastic refractory, and these walls are not water cooled, but are designed to maintain the highest furnace temperature in this lower zone 11. The bottom of the combustion chamber may be formed by a floor 18, which may likewise consist of highly refractory material. The opposite sides of the floor are shown converging to an ash exit or gate 19. The floor may be cooled, as will be described, but not in a manner to reduce materially the high temperature of combustion in the lower zone 11.

The boiler 21 may be of the water tube type, having a bank of water tubes 22, and first and second baffle walls 23 and 24 to direct the gases of combustion suitably between the tubes. If desired the boiler may be supplemented by an additional series of water tubes 25 constituting a screen, tending to reduce preliminarily the temperature and eliminate possible passage of fused ash and formation of slag on the boiler tubes. The gas exit from the furnace is shown as an escape flue 26.

As stated, the pulverized coal is to be introduced into the high temperature zone near the bottom of the combustion chamber, and preferably the fuel is projected inwardly with considerable velocity, and in a generally downward direction, so as to distribute and scatter the fuel and allow it to descend in the high temperature space in the form of a rain of fine particles, which substantially instantaneously take part in the combustion and are completely consumed. There may be a series of fuel injecting burners 27 across the lower part of the front side of the furnace, fed by pipes 28 from any source of pulverized fuel, such as pulverizing machine 29. The burner 27 may take different forms, but is shown as having a curved and flaring shape, with an interior curved separator or wall 30 tending to divide the upper from the lower portions of mixed fuel and air delivered by the pulverizer. The solid matters or fuel will largely, due to centrifugal force, pass around the upper curve and be widely distributed so as to fall in the manner described, indicated roughly at 31. The matter entering below the separator, consisting principally of air, is diverted downwardly so as to strike the floor of the combustion chamber, as indicated by the air travel lines 32. This action of the air tends to cool and protect the floor, the air becoming heated by convection and rising to encounter the descending fuel and take part in the combustion.

Supplemental air for combustion may be introduced through a series of nozzles 34 arranged across the rear. These nozzles are so directed that the introduced air may impinge upon and protect and cool the floor for the reasons already mentioned. The nozzles 34 may be supplied by pipes 35 which may conduct heated atmospheric air to the nozzles through pipes 36 leading from a jacket space or chamber 37 arranged between the outer shell 38 of the furnace and an inner wall 39. Spent gases alone may be injected, but air is preferable as aiding combustion.

The wall 39 may enclose a hopper 40 into which ashes precipitate from the boiler tube spaces, and from which they are carried away to the ash pit by a chute 41.

In times of forced service it may be advantageous to deliver into the lower zone 11 a quantity of high pressure air for combustion and for this purpose a series of air nozzles 43 are shown across the front of the furnace, connected by a header 44, to which air is supplied by a compresser or blower 45, the air being thrown forcibly upon and keeping cool the floor.

Another adjunct, sometimes useful with this invention, is a water supply nozzle 47 arranged to direct water or steam into the lower part of the combustion space, under control of valve 48, with the purpose of assisting the cooling of the floor, and taking part in combustion.

The protection of the floor against the intense heat is thus shown to be effected by the air from burner 27, and from nozzles 34, and nozzles 43, and by the steam or water from nozzles 47. Spent gases could be used for a similar purpose, or the floor could be water cooled, or overlaid with a series of water tubes, arranged and maintained in a manner explained in my prior Patent No. 1,703,814, issued Feb. 26, 1929.

As already explained the fuel combustion takes place and is completed in the high temperature zone 11 in the lower part of the furnace. From here the temperature progressively decreases toward the boiler. While the lower zone is purposely kept at top temperature, the upper or reducing zone 12 is purposely cooled to give the progressive temperature reduction as stated. This is shown as effected herein by means of water cooled walls around the upper part of the combustion chamber. Thus a series or bank of vertical water tubes 50 is shown arranged across the end walls of the reducing space, and a similar series of water tubes 51 across the rear wall thereof, and this water tube facing could be carried around also to the front wall. As the gases of combustion rise their temperature is brought gradually down to a suitable temperature to enter the boiler proper, namely sufficiently below the ash fusion temperature to eliminate deposit of liquid ash on the boiler tubes. The cooling is effected both by the reception and carrying off of the radiant heat of the fire by the wall tubes, and by convection or direct conduction; and the heat thus received in the tubes 50 and 51 causes substantial and useful evaporation which, as the tubes are in circulation with the boiler, greatly increases the effective direct heating surface and evaporative power. The end wall tubes 50 are shown connected by lower and upper headers 52 and 53, in communication with the boiler in any usual manner. The rear wall tubes 51 are shown connected by a lower header 54, and for convenience the upper ends of these tubes may be simple continuations of the tubes 25 already mentioned as serving the function of a water screen between the combustion chamber and the boiler.

Preferably the water tubes surrounding the temperature reducing zone or space 12 are arranged in front of refractory walls or backings. Thus behind each series of tubes is shown a brick wall 56. While this might be slightly spaced outwardly from the tubes its is preferably closely adjacent to them, and a design is preferred wherein portions 57 of the refractory material project forwardly into the spaces between the tubes, substantially in the manner shown in Fig. 2. These portions or lugs 57 may be produced by using refractory bricks of T-shape. Preferably plastic brick of high conductivity is employed. Due to the cooling of gases afforded by the water tubes 50 and 51, the refractory material is not exposed to the deposit of liquid ash, and a refractory may be selected to which such ash will not adhere. In case it may be desired to have access to the water tubes 50 and 51, especially at their lower ends, a series of openings or doors 58 may be provided in the adjacent refractory walls, for inspection, removal of possible slag, etc.

The described method and furnace therefore illustrate the principles of the present invention, and it will be seen, without repeating the objects of the invention, that the disclosure fully accomplishes such objects. The pulverized fuel is introduced in the lower zone or space, where such a high temperature is maintained as to insure complete combustion, the temperature being above the fusion point of the ash. The combustion indeed is substantially instantaneous. The high temperature thus produced is not allowed to reach to or near the boiler, as the reducing space or zone intervenes, and when the gases reach the boiler they are well below the ash fusion point, and therefore free from melted ash, although hot enough to effect the bulk of the evaporation at the boiler. The temperature reducing zone is of substantial extent, and has water cooled walls as described, which progressively reduce the temperature by absorption of radiant heat as well as by convection. The intensely hot ash particles radiate their heat to the tubes and so are reduced from liquid to solid form in suspension. A particular feature of importance will be noted in connection with possible deposit of melted ash on the lateral walls. If this should occur the melted ash will not run down until meeting a cooler zone and there solidify into a ledge, but with this invention will encounter progressively hotter temperatures during the descent, so that no ledge or protuberance will form.

The cooled furnace bottom, the hot zone substantially surrounded by brick work or other refractory, and the reduction zone cooled at the sides by water tubes are all important elements of the present system. The cooled bottom enables the hottest zone to be maintained near the floor and therefore enables the progressive cooling toward the boiler. The floor must be continuously cooled on account of its continuous absorption of heat by radiation; and the cooling may be by convection or in the other ways mentioned, or by a steam superheater placed in the floor. In the hot zone the extremely high flame temperature causes instantaneous combustion of the fuel; no distillation of the volatile matters in the coal is produced to result in loss by smoke discharged by the chimney. In the reduction zone the water tubes or boiler surfaces at the walls are exposed directly to the fire, and they afford an enormous absorption of radiant heat and substantially reduce the ash to a temperature below its fusion point. It is advisable to have at least one square foot of direct exposed water tube surface to each twenty pounds of pulverized coal consumed per hour with thirty to forty percent of excess air. The refractory bricks between these water tubes become extremely hot and assist in the combustion of fuel particles traveling toward the boiler. Under some conditions the center of volume in the temperature reducing zone may cool insufficiently due to its distance from the tubes and therefore it may sometimes be advisable to include in the apparatus the slag screen 25 already referred to. Slag will never form or deposit except near the lower ends of the reducing zone tubes or upon the tubes of the slag screen, and such slag may be removed by picks through small doors as already mentioned. The operation is to a certain extent self adjusting to maintain equally effective conditions of combustion and temperature during variations of load. Thus during periods of light service the combustion will be completed within the first or brick chamber zone. When the load is greatly increased the volume occupied by the combustion may expand into the temperature reducing zone. The combustion flames therefore, during periods of increased service, reflect radiant heat to a greater area of boiler surface than under small loads. In this sense the boiler surface and extraction of radiant heat are self adjusting to the conditions. The principles of this invention enable indefinite increase of rate of combustion of pulverized coal per cubic foot of volume. This is due to the unusually high temperature maintained in the lowest or first zone. There is no reasonable limit to the rate of combustion and therefore the service of the furnace; that shown in Fig. 1 may enable three times the ordinary rate of combustion per unit of volume. This feature enables the furnace size to be greatly reduced. One important factor is the rate of water circulation in the boiler, this being necessary to permit extremely high rates of evaporation. The described arrangement brings about a very effective circulation and enables the boiler to be pushed to high service. With the present invention the boiler may be started or fired in quick time so as to deliver full quantities of steam where demanded. The disclosed embodiment further reduces the problem of handling ashes, since 30% or more of the total ash production may be collected and disposed of through the hopper 40. Other ashes will be collected on the floor and disposed of through the exit 19, aided by air blasts 34 and 43. Melted ash will not be deposited on the floor because the floor being cooled will cause the particles to be solidified as they descend. The high temperature in the lowest zone causes the presence of melted ash particles, which would be deposited as a liquid and form a slag but for the cooled floor. The particles are progressively cooled as they approach the floor and form into flakes before being deposited; hence the importance of the cooled floor. The combustion temperature in the lowest zone may in some cases be maintained between 2200 and 2400° Fahrenheit, thus melting the ash and insuring complete combustion. In some cases the temperature may be maintained several hundred degrees hotter by taking due precautions against the depositing of melted ash on the side walls or floor. In the preferred embodiment the side walls of the high temperature zone are plain refractory walls, brick or silicon carbide; but this is not intended to exclude a certain degree of cooling of these walls, although not to the point of forming water walls, as in the temperature reducing zone, and thus bringing down the temperature of combustion to a point where complete combustion will not be insured. A small number of widely separated water tubes could be used to cool and protect the refractory side walls of the high temperature zone, although if water cooling is used it is preferable to circulate the water at a point not exposed to the flames, or at the exterior side of the walls. Cooling of these walls could be by air, for example by interior air circulation. However, cooling of these walls is not preferable except where combustion temperatures far above 2400° F. are desirable, for example to increase excessively the rate of combustion, such high temperature combustion to be confined to the interior of the volume of the high temperature zone. Attention is called to the feature of the overhanging or inwardly inclined rear wall consisting of water tubes 51 and the refractory backing 56 which constitutes a continuation of the first baffle 23. This structure gives an advantageous course to the flames and permits the ash space 40 to be maintained exterior to the inclined wall, whereby ashes can be collected and delivered by chute 41 as already explained. The water tubes 51 which face the rear wall are in direct connection with the tubes 25 constituting the slag screen already mentioned, and an important feature is that these combined sets of tubes form a separate circulating system from the boiler proper, being fed by independent connections from the main drum, and delivering steam independently to the secondary drum. This improves the circulation and gives a more effective operation at the rear wall and slag screen. The side wall water tubes 50 also are connected to the drum independently of the main boiler tubes. These separate circulating systems carry water at hotter temperatures than the boiler proper. They carry a small amount of water but the hotter water offers less resistance to flow and this increases the rate and effectiveness of the circulation in these tubes, thus affording a high rate of heat absorption per unit of tube area. This principle of construction and operation is one of the important features of this invention.

The embodiment shown in Fig. 3 involves many elements similar to Fig. 1. The combustion chamber 110 has the first or lower zone 111 which may be considered as extending into the space 111$^a$ later to be referred to. The temperature reducing zone 112 is above the zone 111 and below the boiler. Above the front wall 113 may be an arch 114. The rear wall 115 may have refractory blocks 116 containing air passages or delivering air into the furnace. The upright walls 117 close in the combustion chamber at the ends. The floor 118 may consist of convergingly inclined sides delivering to an ash gate 119 beneath which is an ash pit 120. The boiler 121 may comprise the usual tubes 122, the course of the gases being determined by first and second baffle plates 123 and 124. For the elimination of slag is shown a first water screen 125 and above that a second one 125$^a$ consisting of series of boiler tubes arranged in advance of the boiler. The products of combustion may leave by the flue or stack 126. The burners 127 may be two or more in number arranged across the front wall and supplied by pipes 128 from a pulverizer 129 or other source of pulverized fuel. The pulverizer may be fed from a fuel bin 130.

The burner 127 may consist of a refractory enclosure containing mixing and combustion space 111$^a$. The fuel, mixed with air, may be admitted by a plurality of refractory inlets 131, converging upon an axial point within the chamber 111$^a$. Supplemental air for combustion may be admitted axially by an adjustable air valve device 132 supplied from a blower 133 by air passage 133$^a$. This forced draft mixing type of burner gives instantaneous ignition as with the type shown in Fig. 1. The combustion air and fuel meet at right angles, with preliminary combustion, and are thereafter mixed and burned in a confined space surrounded by brick walls. Such a burner is preferably horizontal and used chiefly for large boilers. It permits practically unlimited rates of combustion, due to the restricted combustion space surrounded by brick.

In order to assist cooling the floor, or to blow the ashes off the floor, there may be provided, at the rear side, a series of nozzles 134 fed preferably by steam but perhaps by air, directed to the floor, and fed by pipe 135. A valve 136 in the pipe may regulate the discharge of steam jets, which may be intermittent, or may be under the control of a thermometer or other temperature control device 137. At the front the floor is shown with similar nozzles 143 fed by pipes 144, regulated by valves 145, controlled by a thermostat control device 146 which may be located in the heart of the high temperature zone. In case it is desired to increase the amount of ashes on the floor such ashes may be introduced through an entrance opening 147 fed by a chute 148 from an ash pocket 149 in the boiler or behind the baffle plate.

The cooling of the combustion within the temperature reducing zone 112 may be effected by a series of water tubes 150 placed directly against or inset in the vertical walls surrounding the zone. The pipes 150 are shown interconnected by a lower header 152 and an upper header 153 forming part of the circulation system. Various openings or doors may be provided at different points, thus doors 158 give access to the lower ends of the cooling tubes 150. Doors 159 give access to the slag screens 125 and 125$^a$. Doors 160 at the lower part of the rear wall give access to the furnace floor.

The furnace floor instead of being cooled merely by jets as shown in Fig. 1 may be cooled by pipes carrying water or other fluid. Thus at the front inclined floor portion are shown overlying water tubes 162 which preferably constitute part of the circulation system of the boiler. Analogous tubes 163 overlie the rear floor portion. These are exposed to the direct radiation of the flames and serve to carry off quantities of heat. It is preferred to cover the floor tubes with conducting material for example in the form of sheets of iron 164. With respect to the front floor tubes 162 the circulation may be as follows. A pipe 166 conducts water from the boiler drum 165 to a header 167 which feeds the several pipes 162. These pipes discharge into a header 168 which at its ends connects directly to the headers 152 already mentioned, thence the circulation is through the wall tubes 150 and header 153 to the steam spaces in the boiler. The rear floor tubes 163 may be differently connected. For example, the boiler superheater 170 may discharge through pipe 169 to header 169$^a$ at the lower ends of the floor tubes 163. The header 171 at the upper ends of these tubes is connected by pipe 172 to the main steam exit 173. An effective supplemental superheating is thus afforded.

If desired the accumulating ashes in the ash pit 120 may be sprayed with water by a jet 175, thus keeping the ashes cool and constituting an additional water cooled floor surface.

Quick and uniform circulation is essential, and the described piping and circuits are well adapted to secure this; the position of tubes 150 on the inside of the walls of the reducing zone promote circulation and give the desired cooling action.

The control thermometer 137 may be inserted directly into the interior of one of the floor tubes 163, and according to the temperature operate the motor controlled valve 136, already referred to, an article procurable on the market. Thus the outgoing steam controls its own temperature, since a drop in temperature operates through the thermo-control device to admit more steam to nozzles 134, thereby baring the floor and causing increased direct heating of the tubes 163.

The embodiment shown in Figs. 4, 5 and 6 involves a different application of the invention. The successive zones are in horizontal sequence and are embodied in a locomotive. The combustion chamber or space comprises a first or high temperature zone 211 from which the flames pass through a second or reducing zone 212 and thence to the boiler 221 which here is shown of the fire tube type, the flames passing through tubes 222 to the final outlet or stack 226. At the lower part of the temperature reducing zone is shown an ash pit 220 from which the ashes may be discharged in any usual manner. A series of water tubes 225 may constitute a first water screen to prevent slagging in the boiler, and a second set of such tubes 225ª form a second slag screen, these tubes being connected with the boiler spaces in any suitable manner.

The burner 227 may be similar to that shown in Fig. 3. It is fed by pulverized coal or similar fuel through a pipe 228. A plurality of fuel inlets 231 deliver to the central space and a rear air inlet 232 may be valve controlled and supplied by a forced draft blower. The burner space 211 constitutes the high temperature zone of this invention, and such zone may extend slightly out into the larger space shown. The reducing zone 212 is cooled by wall tubes 250 in which water is circulated. As shown in Fig. 5 these may be spaced out slightly from the lateral walls of the chamber. Their lower ends are connected to a header 252. Their upper ends may be connected directly into the surrounding boiler space 253. These tubes give progressive cooling effect on the advancing gases, in accordance with the principles already explained, so that melted ash will be unable to form slag in the fire tubes. The lower side or floor 218 may be cooled and protected by circulation tubes 262 which may extend from the header 252 to a header 267, supplied by water from the boiler. The floor tubes 262 may be covered by iron plates 264 which absorb the radiant heat and conduct it to the fluid in the tubes, thus preventing the deposit of melted ash on the floor of the combustion chamber. The first or rear wall of the combustion chamber may also be provided with water tubes 269 extending between the upper boiler spaces 253 and the lower header 252 to maintain this wall free from slag. The first or rear wall of the confined burner chamber is of course air cooled by the air of combustion, and the air may be caused to envelop the burning mixture sufficiently to protect the lateral walls of the confined space. The temperature at this point is high, well above the ash fusion point, and combustion is complete. The ashes are cooled in the reducing zone and solidify, so as either to precipitate on the floor, or be discharged with the gaseous products.

Various features of the invention herein disclosed but not made the subject of claim herein are hereby reserved for claim by division or continuation hereof; for example the features of invention disclosed in Fig. 3 hereof have been made the subject of claim in patent application filed by me March 17, 1927, Serial No. 176,137, which application embodies the disclosure of Fig. 3 hereof and constitutes a continuation or partial division hereof.

So also the features of invention particularly disclosed in Fig. 1 by which an ash pocket 40 is formed between the inclined, overhanging and water cooled wall 56 (which is a downward extension of the baffle 23), and a wall 39 to the rear thereof, is not herein made the subject of claim but is reserved and claimed in divisional application filed May 8, 1931, Serial No. 535,922.

There have thus been described definite methods and apparatuses embodying the principles and attaining the objects of the present invention; but as many matters of method, operation, structure, combination, arrangement and detail may be variously modified without departing from the underlying principles it is not intended to limit the invention to such matters except to the extent set forth in the appended claims.

What is claimed is:

1. Method of combustion of pulverized fuel, for example for firing boiler furnaces, consisting in introducing the fuel in suspension in air of combustion, into a substantially uncooled first zone, furthest removed from the boiler, laterally surrounded by substantially uncooled walls, thereby to maintain the highest combustion rate in such first zone, with temperature at or above the fusion point of ash, conducive to complete combustion and causing the combustion gases to pass therefrom onwardly through a laterally enclosed temperature reducing zone, between the high temperature zone and the boiler, while progressively cooling the gases traveling through the reducing zone toward the boiler, namely by maintaining cooled walls laterally surrounding the temperature reducing zone, whereby the gases reach the boiler at a reduced temperature substantially free from melted ash.

2. Method of combustion of pulverized fuel, for example for firing boiler furnaces, consisting in introducing the fuel in suspension in air of combustion, into a first zone, furthest removed from the boiler, laterally surrounded by zone walls the exposed portions of which are composed of non-metallic refractory material, and maintaining such zone walls sufficiently uncooled to maintain within such first zone a maximum combustion rate, with temperature above the fusion point of ash, conducive to complete combustion, and causing the combustion gases to pass therefrom onwardly through a laterally enclosed temperature reducing zone, between the high temperature zone and the boiler, while progressively cooling the gases traveling through the reducing zone toward the boiler, namely by maintaining cooled walls laterally surrounding the temperature reducing zone, whereby the gases reach the boiler at a reduced temperature substantially free from melted ash.

3. Method of combustion of pulverized fuel for firing boiler furnaces, consisting in introducing the fuel in suspension in air of combustion, into a lowest zone, furthest removed from the boiler, said zone being substantially uncooled and laterally surrounded by substantially uncooled walls, thereby to maintain the highest combustion rate in such first zone, with temperature at or above the fusion point of ash, while continually cooling the bottom end wall for its protection, and causing the combustion gases to pass therefrom upwardly through a laterally enclosed temperature reducing zone, between the high temperature zone and the boiler, while continually cooling the walls laterally surrounding the temperature reducing zone, whereby the traveling gases reach the boiler at a reduced temperature substantially free from melted ash.

4. A furnace for burning pulverized fuel in suspension in air for heating a boiler or like apparatus, the combustion space comprising a substantially uncooled first or high temperature zone, furthest removed from the boiler, and laterally surrounded by substantially uncooled walls, and a laterally walled temperature reducing zone between the first zone and boiler, means for introducing and distributing the fuel and air in the first zone for high temperature combustion, and water circulation means at the lateral walls of the reducing zone for progressively cooling the gases traveling toward the boiler.

5. A furnace for burning pulverized fuel in suspension in air for heating a boiler or like apparatus, the combustion space comprising a substantially uncooled first or high temperature zone, furthest removed from the boiler, and laterally surrounded by substantially uncooled walls, and a laterally walled temperature reducing zone between the first zone and boiler, an ash receiving bottom below the high temperature zone, means at said bottom for continually extracting heat therefrom, means for introducing pulverized fuel and air in the first zone for high temperature combustion, and cooling means at the lateral walls of the temperature reducing zone for progressively cooling the gases traveling toward the boiler.

6. A furnace for burning pulverized fuel in suspension in air for heating a boiler or like apparatus, the combustion space comprising a first or high temperature zone, furthest removed from the boiler, and laterally surrounded by substantially uncooled walls, and a reducing zone between the first zone and boiler, means for introducing the fuel and air in the first zone for high temperature combustion, and means at the reducing zone for progressively cooling the gases traveling toward the boiler, consisting of water tubes at the zone walls exposed to direct radiation, and a water screen consisting of spaced apart water tubes across the upper part of the reducing zone, giving increased evaporation and excluding slag from the boiler, said screen tubes connected in circulation with the zone wall tubes and the boiler.

7. A furnace for burning pulverized fuel in suspension in air for heating a boiler, the combustion space of the furnace comprising a first or high temperature zone, furthest removed from the boiler, and laterally surrounded by uncooled walls, and a reducing zone between the first zone and boiler, means for introducing and distributing the fuel and air in the first zone for high temperature combustion, and means at the reducing zone for progressively cooling the gases traveling toward the boiler, consisting of water tubes at the zone walls exposed to direct radiation and connected to the boiler whereby the evaporation supplements that of the boiler; and a water screen of spaced apart water tubes across the upper part of the reducing zone, giving increased evaporation and excluding slag from the boiler, said water screen tubes consisting of transverse extensions of wall tubes.

8. Method of combustion of pulverized fuel, for example for firing boiler furnaces, consisting in introducing the fuel in suspension in air of combustion, into a substantially uncooled first zone, furthest removed from the boiler and laterally surrounded by relatively uncooled walls, thereby to promote maximum combustion rate in such first zone, with temperature above the fusion point of ash, and causing the combustion gases to pass therefrom upwardly through a laterally walled temperature reducing zone, between the high temperature zone and the boiler, while progressively cooling the gases traveling through such reducing zone, by maintaining circulation of cooling fluid in the lateral walls of the zone, so that the gases reach the boiler at a relatively low temperature and substantially free from melted ash.

9. The combustion method of claim 8 and wherein the high temperature zone is maintained at the lower end of the furnace and surrounded by non-metallic refractory walls, and the temperature therein is maintained between the fusing point of the fuel ash and the fusing point of the wall; and wherein the pulverized fuel and air are introduced laterally and distributed in such zone for rapid combustion; and wherein the residues settling in the furnace are taken off through a bottom discharge.

10. A furnace for burning pulverized fuel in suspension in air for heating a boiler or like apparatus, the combustion space comprising first a substantially uncooled high temperature zone, furthest removed from the boiler, and laterally surrounded by relatively uncooled walls, and second a laterally walled temperature reducing zone between the first zone and boiler, means for introducing and distributing pulverized fuel and air in the first zone for high temperature combustion above the fusion point of the fuel ash, water circulation means at the lateral walls of the reducing zone for progressively cooling the gases traveling toward the boiler, and a furnace bottom shaped for passing off the settled residues of combustion to a discharge exit.

11. Method of combustion of pulverized fuel, for example for firing boiler furnaces, consisting in introducing the fuel in suspension in air of combustion, into a substantially uncooled first zone, furthest removed from the boiler and adapted to promote maximum combustion rate and the hottest temperature in such first zone, with temperature above the fusion point of ash, and causing the combustion gases to pass therefrom upwardly through a laterally walled temperature reducing zone, between the high temperature zone and the boiler, while progressively cooling the gases traveling through such reducing zone, by effecting circulation of cooling fluid to maintain cooled the walls laterally surrounding the temperature reducing zone, operating so that the gases reach the boiler at a relatively low temperature and substantially free from melted ash and combustible content.

12. A furnace for burning pulverized fuel in suspension in air for heating a boiler or like apparatus, the combustion space comprising a substantially uncooled non-metallic refractory walled first or high temperature zone, furthest removed from the boiler, and thereabove a laterally walled temperature reducing zone between the first zone and boiler, means for introducing pulverized fuel and air into the first or lowest zone for high temperature combustion above the fusion point of the fuel ash, fluid circulation means at the lateral walls of the second or reducing zone for progressively cooling the gases traveling toward the boiler, and a furnace bottom shaped for passing off the settled residues of combustion to a discharge exit.

13. A water tube boiler furnace as in claim 12 and wherein the combustion chamber walls are shaped to give a reduced entrance to the boiler, and near such entrance is a transverse system of widely spaced circulation tubes extending across the path of the gases ascending from the fluid cooled second zone to the boiler.

In testimony whereof, I have affixed my signature hereto.

JAY GOULD COUTANT.

CERTIFICATE OF CORRECTION.

Patent No. 1,858,450.  Granted May 17, 1932, to

JAY GOULD COUTANT.

It is hereby certified that the above numbered patent was erroneously issued to "Drake Non-Clinkering Furnace Block Company, Inc., a corporation of New York", as assignee by mesne assignments, whereas said patent should have been issued to Furnace Engineering Company, Inc., of New York, N. Y., a corporation of New York, said corporation being assignee of the entire interest in said invention, as shown by the records of assignments in this office; and that the said Letters Patent should be read with this correction therein that the same may conform to the record of the case in the Patent Office.

Signed and sealed this 21st day of June, A. D. 1932.

(Seal)

M. J. Moore,
Acting Commissioner of Patents.